July 30, 1968   D. B. PRICE   3,395,266
RETAINING MEANS FOR INTERCHANGEABLE COOKING CONTAINERS
Filed Oct. 7, 1965   2 Sheets-Sheet 1
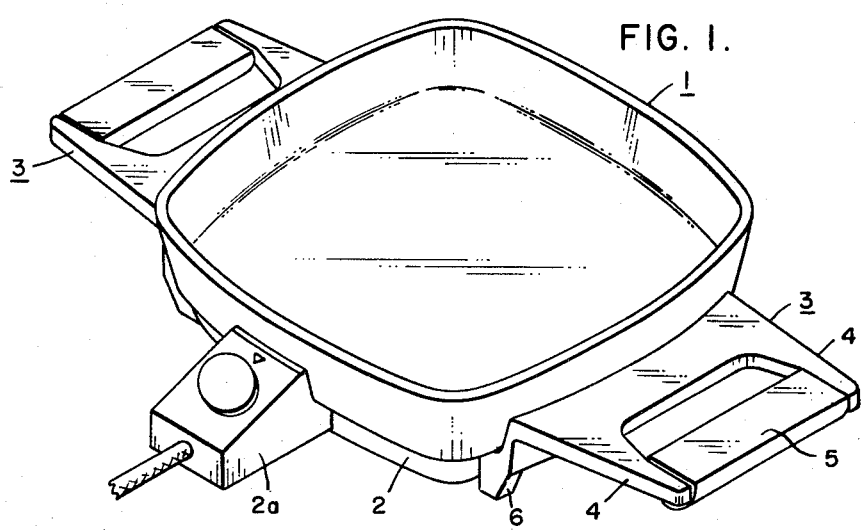
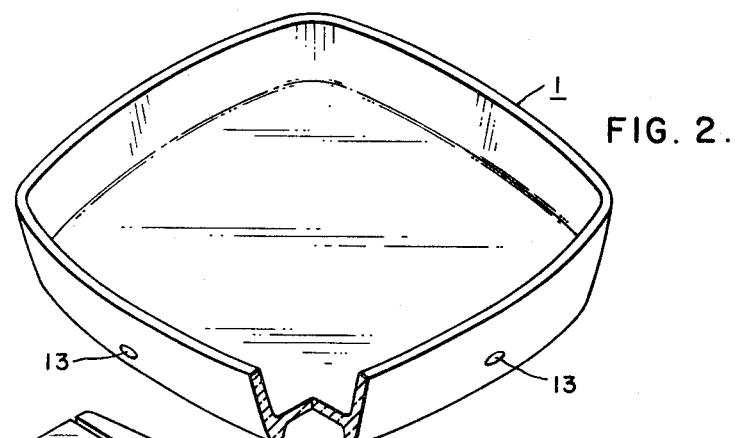
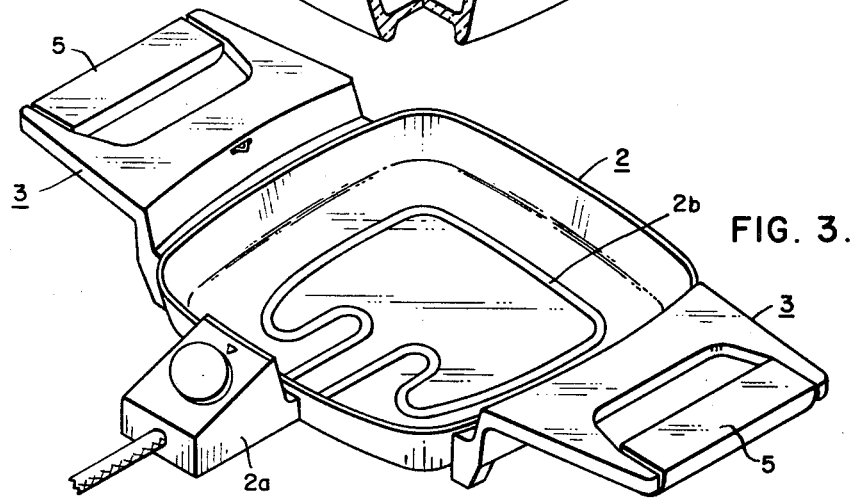

July 30, 1968    D. B. PRICE    3,395,266
RETAINING MEANS FOR INTERCHANGEABLE COOKING CONTAINERS
Filed Oct. 7, 1965    2 Sheets-Sheet 2

United States Patent Office 3,395,266
Patented July 30, 1968

3,395,266
RETAINING MEANS FOR INTERCHANGEABLE
COOKING CONTAINERS
David B. Price, Mansfield, Ohio, assignor to Westinghouse
Electric Corporation, Pittsburgh, Pa., a corporation of
Pennsylvania
Filed Oct. 7, 1965, Ser. No. 505,091
2 Claims. (Cl. 219—433)

ABSTRACT OF THE DISCLOSURE

A base, which includes an electrical element for heating interchangeable cooking containers, has two oppositely disposed handles, at least one of which comprises a rotatable grip member for actuating a spring latch into a mating notch in a side of the container to retain the container on the base. The latch engages the container when the grip is in its normal position for handling the base and is disengaged by rotating the grip member about eccentric supports. The container has a notch on one side which is engaged by the latch on the handle having the rotatable grip.

This invention relates, generally, to electric appliances and, more particularly, to electrically heated cooking ware having interchangeable containers.

One of the problems involved in utilizing interchangeable cooking containers or dishes, composed of a glass-ceramic material, on an electrically heated base is that of preventing any of the dishes from accidentally becoming separated from the base. The problem is more difficult because dishes of different sizes and shapes, such as a fry pan and a sauce pan, must fit the same size base which is portable by itself or when containing one of the dishes.

An object of the invention is to provide for easily and safely attaching or detaching a cooking container to or from an electrical component or base.

Another object of the invention is to provide a manually operable latch for retaining interchangeable dishes on an electrical base.

A further object of the invention is to provide for operating the latch by means of a handle on the base.

Other objects of the invention will be explained fully hereinafter or will be apparent to those skilled in the art.

In accordance with one embodiment of the invention, a base which includes an electrical element for heating interchangeable cooking containers or dishes has two oppositely disposed handles each one of which comprises a rotatable grip member for actuating a spring latch into a notch in a side of the dish to retain the dish or the base. The latch engages the dish when the grip is in its normal position for handling the base and is disengaged by rotating the grip member about eccentric supports. The dish has a notch on each of its four sides so that it is engaged by latches in the two handles regardless of how it is set on the base.

For a better understanding of the nature and objects of the invention, reference may be had to the following detailed description, taken in conjunction with the accompanying drawings, in which:

FIGURE 1 is a view, in perspective, of an appliance comprising a cooking container attached to an electrically heated base by latch means embodying the invention;

FIG. 2 is a view, in perspective, of the cooking container or dish;

FIG. 3 is a view, in perspective, of the base and the control member for the heater element in the base;

Figure 4:
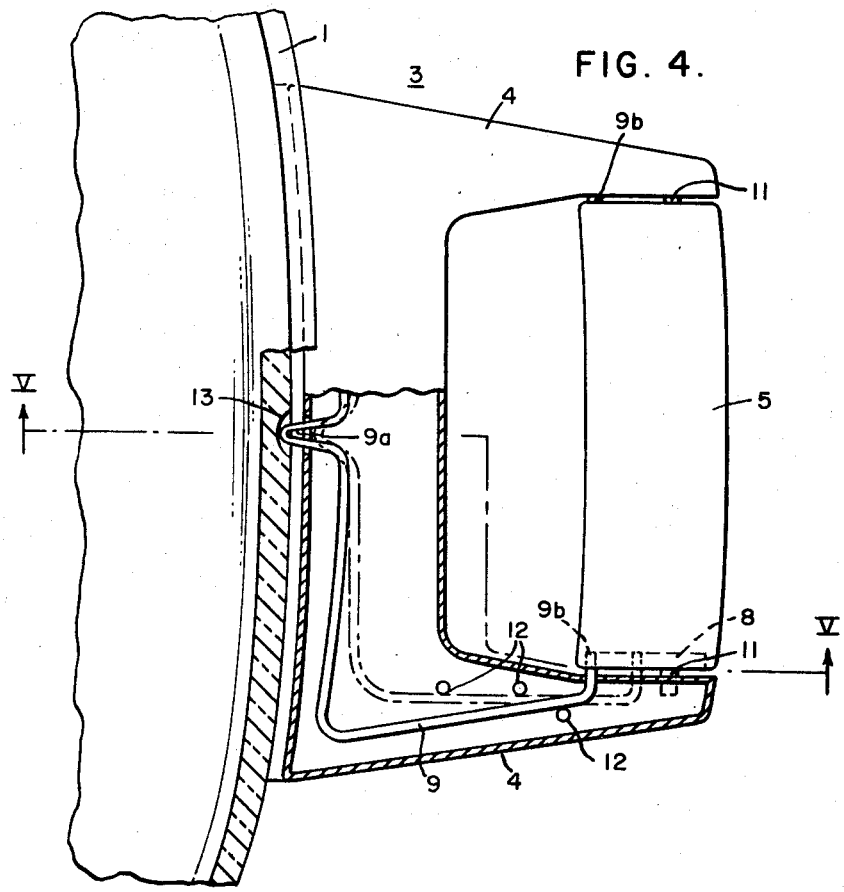
FIG. 4 is an enlarged view, partly in plan and partly in section, of a portion of the applicances.

Referring to the drawing, particularly to FIG. 1, the cooking ware utensil shown therein comprises a cooking container or dish 1, a base 2 having a pair of oppositely disposed handles 3 attached thereto, and a removal control member 2a which is preferably of the probe type suitable for controlling the temperature of a heating element 2b mounted in the base as shown in FIG. 3. The cooking container or dish 1 is preferably composed of a glass-ceramic material capable of withstanding a relatively high degree of heat. The dish 1 is interchangeable with other cooking containers of the same general shape, but of different depths. Thus, the base 2 may be utilized to heat any one of a plurality of containers, such as a fry pan or sauce pans.

As previously explained, the base 2 contains a heating element 2b for electrically heating the dish 1. Since the base is of a portable type and may be carried, along with the dish 1, by means of the handles 3 it is desirable to prevent the dish 1 from being accidentally separated from the base 2 while it is being moved. Each handle assembly 3 in addition to functioning as buffet type handle for carrying the base also contains a latching mechanism for engaging the dish 1 to retain it on the base over the heating element 2b.

Figure 5:
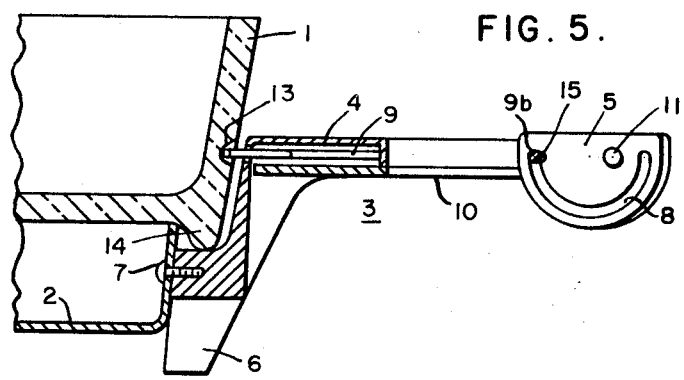
FIG. 5 is a vertical section, taken through portions of the dish, the base and one handle.

As shown most clearly in FIGS. 4 and 5, each handle assembly 3 comprises a frame having two spaced arms 4, a grip portion 5 and two spaced feet 6. The handle is attached to a side of the base 2 by means of screws 7. Each end of the grip portion 5 contains a cam groove 8 in which is disposed one end of a generally U-shaped wire member 9 composed of a resilient material, such as spring steel. As shown most clearly in FIG. 4, the ends 9b of the wire member 9 are bent inwardly to enter the cam grooves 8. The wire member 9 is retained in the handle by means of a bottom cover plate 10, removably attached to the arms 4, which also supports pivot pins 11 for rotatably mounting the grip portion 5 between the spaced arms 4 of the handle. The grip portion 5 is generally semicyclindrical in cross-section and pivot pins 11 are disposed eccentrically or off center in the member 5. Thus, when the grip portion 5 is rotated from the position shown in the drawing, the spring latch member 9 is moved from the position shown by the dotted lines to the position shown by the dot-dash lines in FIG. 4.

When the spring latch member 9 is actuated towards the dish 1 by the cam grooves in the grip 5, a projection 9a on the spring latch 9 enters a notch 13 in the side of the dish 1 to retain the dish on the base 2. Since there are two handles at opposite sides of the base, the dish is engaged by the latching means in each handle to prevent it from being separated from the base. It is desirable to provide a notch 13 in each side of the base so that the dish will always be engaged by the latching means on two sides regardless of how the dish is rotated when it is placed on the base. As shown in FIG. 4, movement of the spring latch member 9 in the handle is guided by vertically disposed pins 12 in the handle.

As shown in FIG. 5, movement of the dish 1 in a horizontal direction relative to the base 2 is prevented by a ridge 14 on the bottom of the dish which engages the top edge of the base 2. Thus, the grip portions 5 of the two handles 3 may be rotated to operate the latch means to retain the dish 1 on the base 2.

As also shown in FIG. 5, a notch 15 may be provided at the one end of each cam groove 8 to receive the end 9b of the spring latch member 9 when the grip 5 is rotated to the position in which the projection 9a of the spring latch 9 engages the side of the dish 1. Thus, unintentional rotation of the grip 5 to release the latch from the dish is prevented. However, when it is desired to release the dish, the grip portion 5 may be rotated to release the latch member 9 by applying sufficient rotational force on the grip portion 5 to force the ends 9b of the spring member 9 out of the notches 15.

In order that the latch means shall be suitable for retaining dishes of other shapes on the base, the notches 13 in the sides of each one of the interchangeable dishes are located at the same distance above the plane of contact between the dish and the base. However, the span or horizontal distance between notches on two opposite sides of each dish need not be constant since the spring member 9 is constructed to take up any differences in this span. Thus, if the span is a maximum and the spring wire strikes the dish early in the rotational movement of the grip member 5 of the handle, then the additional handle cam movement will merely cause harmless temporary deformation of the spring wire latch member 8 within the handle assembly. Also, if the span dimension is a minimum, the spring wire latch member 9 will have sufficient movement to enter the notch 13 and engage the dish when the grip member 5 is rotated throughout its full arc of travel. Thus, the size and shape of the interchangeable dishes may be varied within predetermined limits.

From the foregoing description, it is apparent that the invention provides latching means for retaining a separate cooking container or dish on an electrically heated base, thereby providing a cooking ware unit or utensil. If desired, the dish may be removed from the base and utilized as a separate or non-electrical container. Another dish which is interchangeable with the first dish may be placed on the base and retained by means of the latching means. Thus, a plurality of interchangeable dishes may be utilized with the one electrically heated base. The latching means is simple in structure and is easily operated by means of the handle which also functions in the usual manner for lifting or moving the base with or without the dish being on the base.

Since numerous changes may be made in the above described construction and different embodiments of the invention may be made without departing from the spirit and scope thereof, it is intended that all subject matter contained in the foregoing description or shown in the accompanying drawing shall be interrupted as illustrative and not in a limiting sense.

I claim as my invention:

1. In combination, a base having an electrical element therein for heating a separate cooking container, a handle attached to the base, said handle having two spaced arms, a grip portion rotatably mounted between said arms, cam grooves at the ends of the grip portion and eccentric relative to the axis of rotation of the grip portion, a generally U-shaped spring member carried by the handle with the ends of the spring member disposed in said cam grooves and having a portion adapted to engage a cooperating portion on a container, and said spring member being actuated by rotation of the grip portion to engage the container to retain it on the base over the heating element.

2. In combination, a base having an electrical element therein for heating a separate cooking container, a pair of diametrically opposed carrying handles on the base, at least one of said handles having a rotatable grip portion, cam means formed on said grip portion, and latch means carried by said one handle and having a cam follower portion in engagement with said cam means and a retaining portion adapted to releasably engage a cooperating portion on a container, said latch means being actuated by rotation of the grip portion to engage the container to retain it on the base over the heating element.

References Cited

UNITED STATES PATENTS

| | | | |
|---|---|---|---|
| 190,352 | 5/1877 | Milligan | 248—154 |
| 681,982 | 9/1901 | Savage | 219—433 |
| 1,006,104 | 10/1911 | Kuhn et al. | 219—433 |
| 1,120,884 | 12/1914 | Ayer | 219—433 |
| 1,882,901 | 10/1932 | Reichart | 219—433 |
| 2,448,417 | 8/1948 | Cecchini | 126—24 |
| 2,578,646 | 12/1951 | Ruben | 248—154 |
| 2,749,426 | 6/1956 | Schwaneke | 219—432 |
| 2,798,931 | 7/1957 | Naxon | 219—433 |
| 2,978,564 | 4/1961 | Blanding et al. | 219—459 X |

ANTHONY BARIS, *Primary Examiner.*